(12) United States Patent
Marks

(10) Patent No.: US 8,545,229 B2
(45) Date of Patent: *Oct. 1, 2013

(54) METHODS AND APPARATUS FOR ONLINE AUCTIONS AND MARKET-PLACES UTILIZING PROGRAM TERMS

(76) Inventor: Jeffrey S. Marks, Newport Coast, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,404

(22) Filed: Aug. 24, 2012

(65) Prior Publication Data

US 2012/0323697 A1    Dec. 20, 2012

Related U.S. Application Data

(63) Continuation of application No. 12/758,636, filed on Apr. 12, 2010, now Pat. No. 8,251,702, and a continuation of application No. 09/698,640, filed on Oct. 27, 2000, now Pat. No. 7,720,743.

(51) Int. Cl.
    *G09B 19/00*    (2006.01)

(52) U.S. Cl.
    USPC .................. 434/238; 705/14; 705/16; 705/27

(58) Field of Classification Search
    USPC ............................. 434/238; 705/14, 16, 27
    See application file for complete search history.

(56) References Cited

U.S. PATENT DOCUMENTS

| | | | |
|---|---|---|---|
| 5,826,244 A | 10/1998 | Huberman | 705/37 |
| 5,940,812 A | 8/1999 | Tengel et al. | 705/38 |
| 5,966,699 A | 10/1999 | Zandi | 705/38 |
| 6,012,045 A | 1/2000 | Barzilai et al. | 705/37 |
| 6,151,589 A | 11/2000 | Aggarwal et al. | 705/37 |
| 6,161,099 A | 12/2000 | Harrington et al. | 705/37 |
| 6,167,386 A | 12/2000 | Brown | 705/37 |
| 6,260,024 B1 | 7/2001 | Shkedy | 705/37 |
| 6,311,178 B1 | 10/2001 | Bi et al. | 707/3 |
| 6,385,594 B1 | 5/2002 | Lebda et al. | 705/38 |
| 6,397,197 B1 | 5/2002 | Gindlesperger | 705/37 |
| 6,415,270 B1 | 7/2002 | Rackson et al. | 705/37 |
| 6,553,346 B1 | 4/2003 | Walker et al. | 705/1 |
| 6,584,451 B1 | 6/2003 | Shoham et al. | 705/37 |
| 7,720,743 B1 | 5/2010 | Marks | 705/37 |
| 7,987,182 B2 | 7/2011 | Slothouber et al. | 707/722 |
| 8,251,702 B2 | 8/2012 | Marks | 434/238 |
| 2001/0056396 A1 | 12/2001 | Goino | 705/37 |
| 2005/0251456 A1 | 11/2005 | Perkowski | 705/26 |
| 2008/0189199 A1 | 8/2008 | Sarid et al. | 705/37 |
| 2009/0254971 A1* | 10/2009 | Herz et al. | 726/1 |
| 2010/0088250 A1 | 4/2010 | Magnolia et al. | 705/36 R |
| 2010/0107093 A1 | 4/2010 | Perkowski | 715/763 |
| 2011/0313851 A1 | 12/2011 | Athey et al. | 705/14.46 |
| 2013/0097664 A1* | 4/2013 | Herz et al. | 726/1 |

* cited by examiner

*Primary Examiner* — Pierre E Elisca
(74) *Attorney, Agent, or Firm* — Pillsbury Winthrop Shaw Pittman, LLP

(57) ABSTRACT

An on-line market-place includes an auction wherein one or more predefined terms, qualities, incentives, or other such indicia (generally, "Program Terms") are associated with the particular product and/or service which is the subject of the auction. Customers rank or otherwise designate their preference for these Program Terms (e.g., by selecting a "Preferred Program Term"), and the system then partitions the customers into "pools" in accordance with the selected Program Terms. Merchants then compete to obtain that pool of customers by bidding on the Preferred Program Term. Customers may be pooled according to demographic or other customer characteristics ("Characteristic Pooling"), or according to level of commitment to purchase ("Commitment Pooling").

21 Claims, 6 Drawing Sheets

METHODS AND APPARATUS FOR ONLINE AUCTIONS AND MARKET-PLACES UTILIZING PROGRAM TERMS

RELATED APPLICATION DATA

This application claims priority from U.S. Utility patent application Ser. No. 12/758,636, filed Apr. 12, 2010 which claims priority from U.S. Utility patent application Ser. No. 09/698,640, filed Oct. 27, 2000, which claims priority from U.S. Provisional Patent Application Ser. No. 60/161,818, filed Oct. 27, 1999. The above-identified applications are hereby incorporated by reference into this disclosure in their entirety.

FIELD OF THE INVENTION

The present invention relates, generally, to online commerce and, more particularly, to methods for providing improved auctions and online market-places using program terms associated with the particular goods and services being offered.

BACKGROUND OF THE INVENTION

Increased access to the Internet in recent years has expanded the potential customer-base of sellers of goods and services by geometric proportions, leading to a concomitant increase in Internet-based commerce—particularly in the field of online auctions. This expanded customer-base has also increased the use of group buying power. That is, selling the same product to a group of customers at one time over the Internet generally decreases a merchant's customer-acquisition costs and, as a result, allows them to lower the price of the product.

Currently known methods for providing such auctions and online market-places are, however, unsatisfactory in a number of respects. For example, the established systems for conducting online auctions are only suitable for selling products where there is only one term of relevance, i.e., the price. This is because in most auctions the sole subject of bidding is price. These and other currently known systems are not suitable for use in connection with the auction of a product or service which has multiple aspects of value, and for which there are a number of variable terms.

In a credit card offering, for example, different people may assign a different value to the long-term interest rate, the introductory APR, the length of the payment grace period, the minimum monthly payment, and any applicable incentive program. The results of bidding focused on one aspect of the product offering will generally benefit the customers valuing that aspect more than it will benefit the other customers.

In addition, some merchants may not be able to, or may not wish to, offer the same product or service to certain customers. This may be due to a number of factors, for example, licensing or legal restrictions. Certain software resellers, for example, may only be licensed to sell products to customers located in specific geographical regions. A second reason may relate to profitability; i.e., the profitability of a customer may be determined or estimated based on certain demographics of the customer. The profit associated with selling life insurance, for example, usually varies according to the age and health of the customer. Similarly, a lender's decision as whether and under what conditions to loan money to a customer usually depends on annual income, credit score, and other such demographics.

For these and other reasons it becomes difficult, if not impossible, to treat different customers in the same manner. Therefore the traditional auction format is generally unfeasible or undesirable for merchants to bid on groups of customers having such differences.

Another limitation of current auction formats is that customers must wait while others sign up to participate, or wait for the expiration of lengthy rounds of bidding, which are often conducted over a period of days or weeks via electronic mail.

Methods are therefore needed in order to overcome these and other limitations of the prior art.

SUMMARY

In accordance with one embodiment of the invention, an online auction is provided wherein one or more predefined terms, qualities, incentives, or other such indicia (generally, "Program Terms") are associated with the particular product and/or service which is the subject of the auction. Customers rank or otherwise designate their preference for the these Program Terms (e.g., by selecting a "Preferred Program Term"), and the system then partitions the set of customers into "pools" in accordance with the selected Program Terms. Merchants then compete to obtain that pool of customers by bidding on the Preferred Program Term.

In accordance with another aspect of the present invention, customers are pooled according to demographic or other customer characteristics ("Characteristic Pooling").

In accordance with another aspect of the present invention, customers are pooled according to level of commitment to purchase ("Commitment Pooling").

In accordance with another embodiment of the present invention, customers who would otherwise be partitioned into different pools are grouped in the same pool, and a bid that changes a first Preferred Program Term associated with a first customer automatically causes a bid of equivalent value to be made to one or more different Preferred Program Terms associated with one or more other customers.

In accordance with yet another embodiment of the present invention, "ghost pools" are used to select preferred merchants for particular auctions.

In accordance with another embodiment of the present invention, an electronic marketplace is provided wherein Program Terms can be highly tailored by the purchaser immediately.

In accordance with another embodiment of the present invention, the previously described embodiments are used in combination with each other and/or any other sales method or format to provide a high-efficiency online market-place.

BRIEF DESCRIPTION OF THE DRAWINGS

The subject invention will hereinafter be described in conjunction with the appended drawing figures, wherein like numerals denote like elements, and.

DETAILED DESCRIPTION

Systems and methods in accordance with various aspects of the present invention provide for an on-line marketplace wherein one or more predefined terms, qualities, incentives, or other such Program Terms are associated with particular products and/or services, and these Program Terms are then advantageously employed to pool real or potential customers for processing as described in detail below.

In this regard, the present invention may be described in terms of functional block components and various processing steps. It should be appreciated that such functional blocks may be realized by any number of hardware and/or software components configured to perform the specified functions. Such general techniques and components that are known to those skilled in the art are not described in detail herein.

Figure 1:
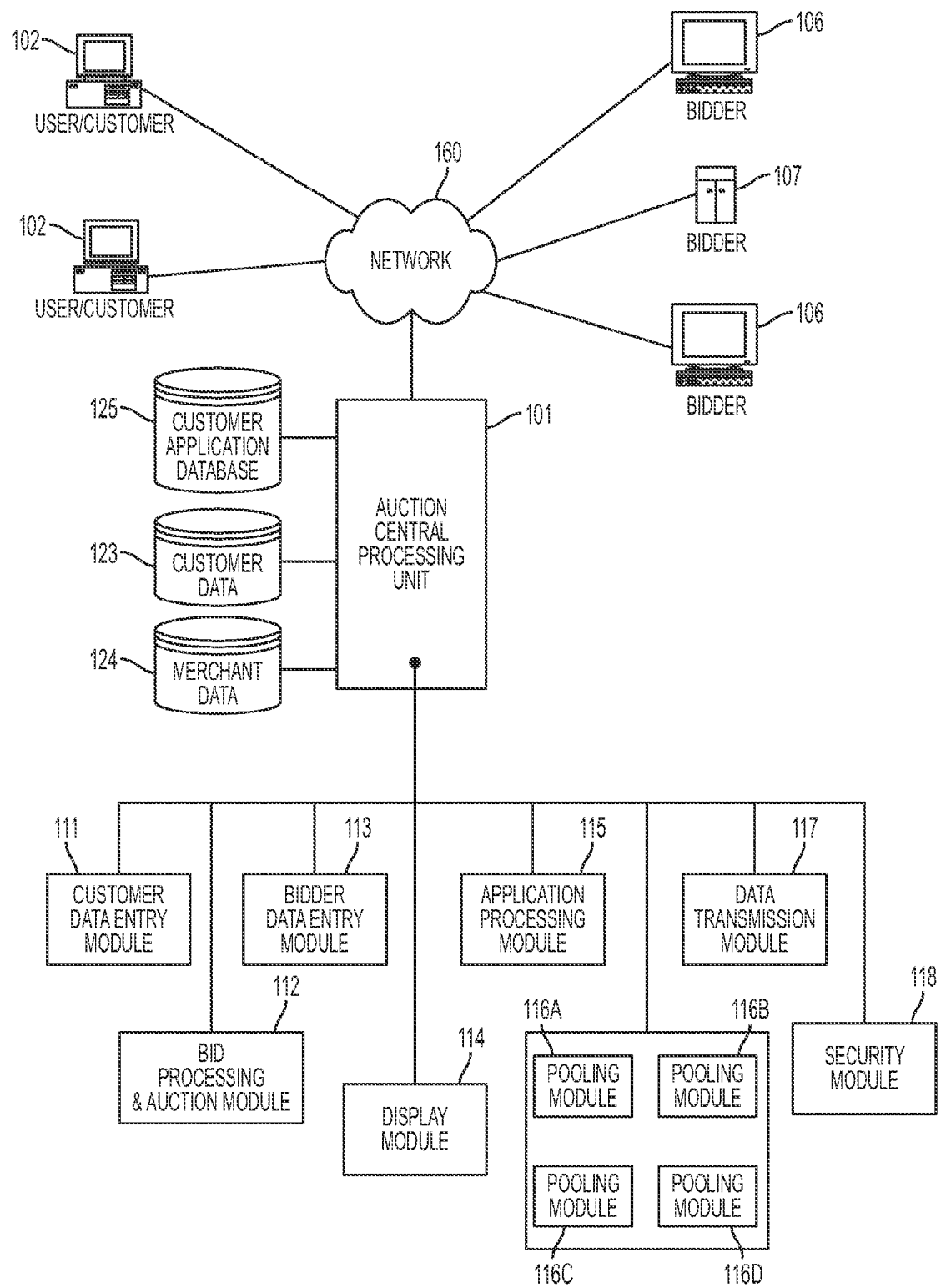
FIG. 1 is a schematic overview of a distributed, online marketplace in accordance with various aspects of the present invention.

Briefly, referring now to FIG. 1, a system in accordance with various aspects of the present invention comprises an auction central processing unit (ACPU) 101 configured to communicate with one or more user/customer systems 102 ("customer systems") and one or more bidder systems 106 and 107 ("bidder systems," or "merchant systems"), through a suitable network 160 (e.g., the Internet, an intranet, an extranet, or the like). ACPU 101 conducts collection and management of product information and customer screening information received from bidders 106 and 107 ("merchants" or "bidders"), and conducts collection and management of customer auction information and preferences as well as customer screening information. ACPU 101 partitions similarly situated customers/users (or simply "customers") into groups, or "pools", on which bidders 106 will competitively bid in an auction coordinated by ACPU 101.

Bidders 106, customers 102, and ACPU 101 may be coupled to network 160 through any convenient network access device and connection, e.g., analog modems (V.90, V.32, etc.), cable modems, xDSL interfaces, T1 lines, wireless connections, and the like.

The illustrated embodiment includes a plurality of program modules 111-118 executable primarily on a programmed data processor shown as ACPU 101. ACPU 101 typically comprises one or more computers, servers, and the like, running a compatible operating system. Mass storage for the system generally comprises hard disk drives, although other storage methods may be employed. Residing on the hard disk drives, and central to operation of the system, are various data files and program modules. These files may be integrated and interact with each other through ACPU 101. It will be appreciated, however, that the various modules may be distributed over any number of individual computers and servers. In the illustrated embodiment, the program modules include customer and merchant data entry modules 111 and 113, an application processing module 115, one or more pooling modules 116A-D, data transmission module 117, display modules 114, and a bid processing and auction module 112.

The merchant terminals might include automated processors 107 which allow the merchants to automate some or all of the process rather than requiring humans (who operate computers 106) to participate in the auction. Customer terminals 102 may also include facsimile (fax) modems or printers (not shown) through which hard copies of data or reports can be transmitted or received. Similarly, merchant terminals 106 and 107 and ACPU 101 may also include corresponding fax modems and/or printers through which hard copies of data or reports can be transmitted or received.

Security may be provided between user/customer terminals 102 and central processing unit 101 by any suitable method, for example, through the use of a dial-back security module 118. Similarly, security may be provided between merchant terminals 106 and 107 and ACPU 101 by means of dial-back security module 118 or other such suitable system. Generally, security module 118 is a software module which is coupled to ACPU 101 and which accesses and secures communications ports associated with ACPU 101.

ACPU 101 may also interact with one or more third parties (not shown) for verification of customer information, credit reports, and the like.

It should be understood that the present invention may be realized and implemented in any suitable computer network environment. In accordance with conventional networking applications, the processes and methods described above can be carried out by a server having an appropriate amount of memory and processing power. The invention is not limited to Internet applications and, indeed, may be carried out in the context of any appropriate system where a number of customers can be linked to a central processing site.

While operation of the system will be described in detail below, in general, a merchant, who is typically a seller or reseller of products or services, e.g., a car dealer, a lender, a store operator, a telephone long distance company, an insurance company, or any broker, middleman, or reseller of products or services, accesses a merchant terminal 106 and initiates a communication session with central processing unit 101. Once communication is established, bidder data entry module 113 will typically lead the merchant through the application process, prompting the merchant with a series of questions or data fields which are part of an online application required to register and participate in one or more auctions, and displaying the terms and conditions for participating in an online auction.

The merchant then enters any merchant-specific information requested into the merchant terminal 106 by means of an attached keyboard or other suitable input device. The online application would include general merchant information, such as name, address, or business history, information about the type of auctions in which the merchant wishes to participate, and would request the specification of certain criteria of customers on which the merchant wishes to bid, such as credit information, address, age, and any other criteria which a merchant may need to evaluate whether or not to provide certain products to a customer, or under what terms to provide such products to a customer, and/or whether such a customer is desirable to the merchant. In the alternative merchant processor 107 communicates with central processing unit 101 to perform some or all of the operations described above. Information, which is entered at this step, is preferably stored in a merchant database 124 for later retrieval and use.

The customer, who is typically a consumer, a business, a reseller of products, a broker or middleman, such as a loan broker, insurance broker, communications services broker, or any other such party that desires to purchase a product or service, for itself, or on behalf of others, accesses a customer terminal 102 which may be in the form of a personal computer, a business computer, a personal data assistant (PDA), or the like, and initiates communications with ACPU 101.

Once communication is established, the customer typically views a video display associated with customer terminal 102 and reads a series of questions or data fields on the display making up an online application to participate in one or more auctions, and the terms and conditions related to participating in the online auction. The customer then enters any requested customer-specific information into customer terminal 102 by means of an attached keyboard or other input device. The information is directly entered into the appropriate field on the display. Such information may include, among other things, (A) personal information of the customer such as name, address, social security number, name of employer, income and the like; (B) designation of the auction in which the customer wishes to participate or the product or service which the customer wishes to purchase; (C) any other information which a merchant may request or need to evaluate whether or not to provide certain products to a customer, under what terms to provide such products to a customer, and/or whether such a customer is desirable to the merchant; and/or (D) information required to determine how the customer will be pooled or grouped with other customers, such as (i) the customer's designation and ranking, in the order of importance, of the Program Terms discussed below; (ii) designation of certain characteristics of customers, such as for example, credit information, zip code, sex, age, and the like; (iii) the customers designation of whether it will commit up front to purchase an item or service upon consummation of an auction (if the final offer resulting from the auction contains certain minimum terms); and/or (iv) other information related to the pooling methods. Information which is entered at this step is preferably stored in a loan application database 125 for later retrieval and use.

While the details of pooling will be discussed below in conjunction with FIG. 2, an overview of an exemplary auction process will now be described in conjunction with FIG. 3.

Initially, at step 502, the system determines which product is to be auctioned. A special auction database is created and assigned a unique auction number (step 504). Proper pools are identified an assigned pool numbers (step 508, described in detail below after discussion of the particular embodiments).

Next, in step 506, qualifying merchants are identified from the application process (i.e., via database 124 shown in FIG. 1). Auction information (e.g., auction number, pool data, bidding password, date and time of the auction, etc.) is then provided to qualifying merchants (step 510).

The system then queries whether the merchant has opted to participate in the auction (step 512). If not, the merchant is disqualified and an appropriate confirmation is sent (step 514); if so, the system continues with step 516 (determining whether merchant will participate manually, passively, or both) and then step 518, where the auction/stage screen is made available on the auctioneer's Web site that includes the Preferred Program Terms and any other items to be displayed to the merchants in connection with the auction.

In step 520, an appropriate notification is sent to the merchants (and, possibly, the customers, who may be able to view the auction online) indicating that the auction will commence (step 522). During the auction, bids are received and processed as shown. Specifically, the illustrated system queries whether a given bid has been submitted within the remaining time limit set for the auction stage (which may be a constant set time or a certain period of time during which there has been no bidding activity) (step 524). If not, the system continues with step 546 (described below); If so, the system queries whether the bid includes a valid merchant password (step 526).

If the password is not correct, an appropriate notification is sent (step 536). If the password is correct, the system queries whether the bid is better than the current value (step 528), and whether the bid exceeds the minimum incremental threshold (step 530). If not, a notification is sent as above (step 536).

Next, the system queries whether the bid simultaneously affects other Program Terms (step 532). The details of interaction between Program Terms is discussed in further detail below. If other Program Terms are affected, changes to the other bid terms are calculated and processed (step 534) and processing continues with step 540; if not, the bid is accepted (step 538), and the merchants are notified of a change in program terms and the auction user interface (e.g., Web site) is modified accordingly (step 540).

If there is any more time remaining in the stage (query 542), the system returns to step 524. If not, the auction results are sent to the merchants (step 544), and the system queries whether there is another stage of bidding (step 546). In the event there is another stage, the system determines whether the merchant qualifies. If so, the pool data is updated (step 526), and processing continues as before with step 518. If the merchant does not qualify, an appropriate notice is sent (step 550). The meaning of an auction "stage" is discussed below.

In the event there are no other stages of bidding ("No" branch of step 546), the auction terminates (step 552), and auction results are sent to merchants (step 554). In the event the auction was a ghost auction (query 558), results are deployed to past and future registrants falling within the appropriate pool or pools (step 556). If it was not a ghost auction, the results are sent to the customers (step 560).

First Embodiment

A system in accordance with one embodiment of the present invention provides for conducting an online auction whereby sellers of products which have one or more associated Program Terms conduct an auction around the Program Terms depending on, and in the order of, the importance of the Program Term to the potential customer. Customers rank different Program Terms in their order of importance to such customer, and thus specify a "Preferred Program Term." Customers who assign the highest rank to the same or similar Program Term are pooled together ("Program Term Pooling"). Merchants then compete to obtain that pool of customers by bidding on the Preferred Program Term.

In addition to using Program Term Pooling as the sole method of pooling for an auction, Program Term Pooling may be used to further subdivide customers that have already been pooled under another pooling method that are described below.

A variation of this embodiment of the invention provides for conducting an online auction where merchants can bid on pools of customers that share a common demographic or, more generally, a common characteristic (i.e., "Characteristic Pooling"). For example, certain sellers may only be licensed to sell products to customers located in a specific geographical region. As another example, the profit associated with selling a particular product to a customer, such as life insurance, may vary according to the age and health of the customer. Yet, as a further example sellers may wish to sell products to customers which have a certain minimum credit score, or may wish to bid differently on customers depending on their credit score. Characteristic Pooling of customers referred to above into pools based on geographical location, age, or credit score, would facilitate an auction by the sellers referred to in those examples.

In addition to using Characteristic Pooling as the sole method of pooling for an auction, Characteristic Pooling may be used to further subdivide customers that have already been pooled under another pooling method, such as Program Term Pooling. For example, in terms of the insurance industry, potential customers may first be split into pools of customers depending on their Preferred Program Term (i.e., deductible coverage or monthly premium), and the customers in each of those pools may be further subdivided based on a shared characteristic, such as driving test score, or geographical location.

A second variation of the first embodiment of the present invention provides for conducting an online auction wherein sellers of products can bid on pools of customers that have been grouped based on their level of commitment to purchasing a product or service ("Commitment Pooling"). The pre-committed category will likely be able to obtain an increasingly better offer because bidders will be incented to offer pools of pre-committed customers more attractive rates than pools of non-committed users as the bidders are guaranteed to receive a specific number of acceptances.

For example, one pool will contain customers who will commit up-front to purchase an item or service upon consummation of the auction if one of the final offers contains certain minimum terms, while a second pool will contain customers who will not agree to commit up-front and are just browsing. This level of pooling allows the sellers to focus on the pool of committed customers. This fosters a more competitive bidding process for the committer pools because the sellers know that the customers within the pool are guaranteed to accept one of the winning offers. It follows that the committing pools will receive better offers, and more and more customers will be drawn to pre-commit.

In addition to using Commitment Pooling as the sole method of pooling for an auction, Commitment Pooling may be used to further subdivide customers that have already been pooled or sub-pooled under other pooling methods, such as Program Term Pooling, or Characteristics Pooling.

Depending on the complexity of the market place, the make-up of the customers, and the number of customers signing up for a given auction, these sub-sub pools can be further divided into other levels of pools based on other shared characteristics. For example, the pools of potential customers with similar credit ratings or attractiveness to lenders may be further divided into further pools based on their amount of monthly credit card spending, and those sub-pools may be divided into sub-sub-pools based on state of residency or zip code of the customers.

Having thus given an overview of the first embodiment of the present invention, an example which incorporates Program Term Pooling and Characteristic Pooling drawn from the credit-card context will now be described.

1. Online lender registration—Each lender completes one confidential online registration form in which it selects the criteria it uses to determine what types of applicants the lender is interested in (the "Lender Criteria"). Such criteria include outstanding debt, credit score, household income, and monthly credit card spend.

2. Online customer applications—Each customer completes a confidential online application in which it authorizes the present system to pull a credit report and provide it anonymously to lenders. On the application, the customer ranks in order of importance a list of 2-3 program qualities or incentives that they prefer most (the "Program Term"). An example of program terms related to a credit card include a low introductory Annual Percentage Rate ("APR"), a long introductory period, a low overall APR, a long payment grace period, an annual fee, and a rewards program. The most important term for each customer is the "Primary Preferred Program Term." It is important to note that each customer's Primary Preferred Program Term may not necessarily be the subject of an auction. If not, the Primary Preferred Program Term as used herein means the Program Term which a customer ranks higher than any of the other Program Terms bid on in a particular auction. At the time of completing the application, customers may be presented with certain information about the standard terms and conditions of the credit card programs.

3. Automated applicant grouping—The present system groups applicants into two pools based on their Primary Preferred Program Term. The first group consists of applicants ranking introductory interest rates as their #1 priority while the second group consists of applicants ranking long-term interest rates as their #1 priority. The customers in these two pools are then divided into several pools based on customer credit scores.

4. Automated transfer of information to banks—The present system may provide each lender with a summary report that contains the list of pools that meet the Lender Criteria and the number of applicants in each pool. The present system will also send each lender a detailed report and a data file for each pool, which contain the information about each applicant that the Lender's DSS (Decision Support System) needs to generate an offer for each applicant within a pool (e.g., income, outstanding debt, credit score). Lenders may also be passed a minimum set of criteria for an offer.

5. Analysis of pools—After the lender loads the data file into its DSS and the DSS calculates an offer for each applicant within a pool, the lender suitably aggregates all offers within a pool into one offer, which applies to the entire pool. In doing so, the lender pays special attention to the Primary Preferred Program Term in which the pool is interested because this is the feature on which the auction will focus. For example, if it is a low-introductory APR pool, the lender will determine the lowest introductory APR it can offer to the pool. The present system may offer software to lenders that will allow them to easily aggregate DSS offers for individuals into an offer for the entire pool.

6. Bidding—The auction will preferably take place on the present system's Web site via a secure connection. During the auction, lenders bid on the Primary Preferred Program Term for each pool. All bids placed must beat—not merely meet—the current lowest bid. The present system will display the outstanding low bid for each pool during the auction. Customers can preferably watch the auction in real-time.

The auction will continue for a suitable period time, for example, until the later of one hour or the moment a specified increment of time passes without a new bid being submitted. For example, after one hour, bidding might cease when no new bid is received within a five-minute time period.

7. Selecting the winning bid—At the end of the bidding process, the lender with the lowest bid on the Primary Preferred Program Term for a specific pool wins the auction.

8. Presenting results to customer—The final offer of the winning lender is presented to each applicant in a tabular format, which outlines the important program features (e.g., intro rate, annual fee, long-term rate). The purpose of this format is to make the offer easy to understand by highlighting key attributes and describing them in plain English. Customers may also review the details and the terms and conditions of the program.

9. Accepting an offer—Customers have a finite length of time (e.g., 24 hours) to accept the offer. They can either accept upon initial review or return to the present system within the window of opportunity, enter a password (which suitably brings up their offer) and accept the offer. Consumers who accept can specify an amount and location of any debt they wish to transfer to the winning lender. The system will transmit the identity of the applicant in addition to other relevant information to the chosen lender.

10. Delivering card to customer—Upon receiving an applicant's acceptance to their offer, the lender will preferably issue the credit card and conduct the appropriate balance transfers as requested by the customer.

Second Embodiment

A second embodiment of the present invention combines, into one pool, customers who would typically be assigned to different pools based on one or more of the pooling methods described above, and allows merchants to bid on those pools. For example, as applied to Program Term Pooling, this embodiment of the invention equates the values of the two, three or more Preferred Program Terms on an incremental level so they can be bid upon simultaneously; i.e., it allows merchants to issue a bid to change one Preferred Program Term shared by some of the customers in the pool, which automatically causes a bid of equivalent value to be made to a second, third or any number of other Preferred Program Terms shared by other customers in the pool.

As applied to Characteristic Pooling, there may be different amounts of profit associated with selling the same product to customers having different demographics. For example, a 22 year old student driver with a straight-A average may statistically pose a significantly lower risk to an insurance company that a 16 year old student driver with a C average. Assuming equivalent premiums, the 22 year old would be more profitable than the 16 year old. In such cases, the lowest possible insurance rate, coverage, or other Program Term an insurance broker could get for each of the drivers would vary. Therefore, it would generally not be possible to bid on a pool containing both types of drivers. This embodiment of the invention allows for those drivers to be combined into one pool and bid upon together.

This further consolidation of customers may provide customers with additional buying power and, at the same time, reduce the merchant's customer acquisition costs. This embodiment allows for the creation of, and bidding on, a pool of customers who would have been separated into two or more pools under the first embodiment of the invention because such customers had different Preferred Program Terms, a different level of commitment, a different key characteristic, or any other differences that would change the relative values of such customers to merchants, or, in other words, would ordinarily prevent merchants from treating such customers the same.

The following presents the steps corresponding to one method for practicing this embodiment of the invention.

First, a minimum offer containing set Program Terms is created (a "Base Offer"). Second, the Preferred Program Term of one customer (the "First Preferred Program Term") is subdivided into numeric or other increments, usually of equal value, that may be the minimum increment by which a bid may change such Program Term (a "Bid Unit"). A Bid Unit serves as a measuring stick and a starting point for creating a ratio that would be employed to complete this method.

Second, a monetary or other value is calculated for and/or assigned to the Bid Unit (a "Unit Value"). One method of calculating a Unit Value is to determine or estimate the loss of value to a merchant caused by selling the product or service after changing the applicable Program Term by one Bid Unit. The Unit Value may be based on, among other things, the size of a particular Bid Unit, the number of Preferred Program Terms being bid upon; the number of potential customers within a pool, and the circumstances of a particular auction.

Third, a second Preferred Program Term (the "Second Preferred Program Term") must be divided into Bid Units that have the same Unit Value as the Bid Units for the First Preferred Program Term can be determined.

Fourth, a ratio is created with Bid Units of the First Preferred Program Term and the Second Preferred Program Term (the "Term Ratio"). Using the Term Ratio, the extent to which a change in the bid on the First Preferred Program Term will lower the bid on the Second Preferred Program Terms can be determined. Term Ratio computation is described in further detail below in conjunction with FIG. 4.

One example includes the following steps: (A) determining the monetary values (to merchants) of selling a product or service to a particular customer account (or pool of accounts) (i) with a Preferred Program Term set at a specific level, and (ii) with the same Preferred Program Term changed by a certain increment; (B) making the same value determinations with respect to a second Preferred Program Term; and (C) creating a ratio (or other mathematical calculation or formula) to calculate the effect that a decrease in one Preferred Program Term has on any number of other Preferred Program Terms. The Term Ratio can also be calculated for non-numerical Program Terms by splitting the Program Term into increments of the value or Bid Units, each of which equals the applicable Unit Value.

Applying this method to the bidding in an auction, a bid to lower (or raise, as applicable) the offer on one Preferred Program Term will automatically and simultaneously lower (or raise, as applicable) the merchant's offer or bid on one or more other Preferred Program Terms of other potential customers within the same pool, by a predetermined amount. Each bid, however, would affect only the Preferred Program Term of each customer within the pool. In other words, if X, Y and Z are the Preferred Program Terms for Customers 1, Customer 2 and Customer 3, respectively, a bid to change Term X for Customer 1 will automatically change Term Y for Customer 2, and Term Z for Customer 3. However, Term X will remain unchanged for Customer 2 and Customer 3, and Term Y will remain unchanged for Customer 1 and Customer 3.

It should be recognized that under this exemplary method, a loss or gain to a merchant caused by changing a Program Term may not be lock-step due to the principle of diminishing returns and/or other such reasons. That is, the Unit Value of a Bid Unit may not be constant and may change after each increase or decrease by a Bid Unit. This embodiment of the invention contemplates using any number of formulae to account for such a case.

This method may be illustrated by the following example of an auction for pools of credit card customers. It will be appreciated that credit cards generally have several Program Terms to which different customers may assign different values. Such Program Terms include, among other things, the long-term interest rate, the introductory APR and the length thereof, the length of the payment grace period, the minimum monthly payment, and applicable incentive programs.

The hypothetical auction employs Program Term Pooling only, and relates to combining into one pool customers who have chosen two or more different Preferred Program Terms, including Low introductory APR ("Term A"), low overall APR ("Term B"), and length of payment grace period ("Term C").

First, the following Base Offer is created and includes, among other terms, the following Program Terms:
Term A (Introductory APR)=9.99%
Term B (Overall APR)=18.0%
Term C (Length of Payment Grace Period)=10 days Assume, first, that the applicable pool contains Term A and Term B customers only. Second, assume that, in connection with Term A, it is determined that one Bid Unit equates to one-tenth of one percent ($1/10\%$). Third, assume that it is determined that the Unit Value of one Bid Unit for Term A is $1.00, so that each one-tenth of a percentage point that Term A is lowered equals a $1.00 loss to the lenders. Fourth, assume that it is determined that Term B must be decreased by two-tenths of a percent ($2/10\%$) to render a $1.00 loss to the lenders. In other words, the Bid Unit for Term B is two-tenths of one percent ($2/10\%$). Fifth, the Term Ratio of Term A to Term B is calculated to be one tenth ($1/10$):two tenths ($2/10$), or 1:2. Approximately the same loss to the lenders is caused by lowering Term A by one tenth of a percent and lowering Term B by two tenths of a percent. Therefore, in an auction, a bid lowering Term A by 2% (from 9.99% to 7.99%) for Term A Customers will simultaneously lower Term B by 4% (from 18.00% to 14.00%) for Term B Customers.

Now assume that Term C Customers are added to the pool. It is determined that the Bid Unit for Term C is three-quarters ($3/4$) of a day because the lenders lose approximately $1.00 for each three-quarters ($3/4$) of a day added to the grace period. This results in the following Term Ratio:

Decrease Term A by $1/10\%$=
Decrease Term B by $2/10\%$=
Adding $3/4$ of an additional grace day
or
Term A: Term B: Term C=($1/10\%$):($2/10\%$):($3/4$ of a day)
or
Term A: Term B: Term C=(1):(2):(7.5 days)

Assume a lender bids to lower Term A by 0.3% (from 9.99 to 9.69%). Applying the applicable ratios:

Term B would be decreased by 0.6% (from 18.0% to 17.4%), and

Term C would be increased by 2.25 days (from 10 days to 12.25 days, which may be rounded up or down)

Another embodiment of this invention applies the concepts discussed immediately above to equate other differences between potential customers (i.e., other than Preferred Program Terms). This allows the further consolidation of potential customers into fewer pools (increasing buying power for the customers and decreasing the number of pools on which the merchants must bid, and therefore, likely decreasing the merchants' customer acquisition costs). This embodiment of the invention could be used in connection with or in place of Characteristic Pooling, Commitment Pooling, or any other pooling method, or a combination thereof. It enables the grouping of potential customers who fall within different Program Term Pools, Characteristic Pools, Commitment Pools or other pools, into a single pool (or fewer pools). In other words, by employing algorithms and formulae, a person or computer could calculate, determine or approximate the amount by which a bid on one Preferred Program Term for a particular potential customer in a particular Characteristic Pool or Commitment Pool, should correspondingly effect a bid on the same or a second Preferred Program Term for a different potential customer who is in a different Characteristic Pool or Commitment Pool.

Using the credit card auction to illustrate this concept, assume that an auction involves potential customers who prefer either Term A or Term B, and who have different credit ratings ranging from poor to excellent. All else being equal, generally, the Unit Value of a Bid Unit decreasing the bid on Term A would differ based on the credit rating of the customer. A formula similar to that discussed above may be used to equate such differences. For example, assume that applying the formula discussed above, it is determined that for potential customers with an excellent credit rating, a bid decreasing Term A by 2% will correspondingly decrease Term B by 4%. A second formula (i.e., a ratio or fraction) may be employed to determine the amount that Term A must be decreased for customers with a poor credit rating, to equal the loss of value to the lenders caused by the decrease in Term A by 2% for the customers with an excellent credit rating. A similar formula could be used to determine the corresponding bid on Term B for the customers with a poor credit rating.

This embodiment of the invention can be used alone, together with the algorithmic formula first described above (i.e., the "Term Ratio" Method), or together with any other Pooling method described herein.

It will be understood that different merchants competing for the same customers may assign different values to the same Bid Units (i.e., different systems for assigning units). It would be difficult for such merchants to participate in an auction under this system. This suitably compensates for such differences through a method that equates the bids of different merchants so that such merchants can bid on one or more Program Terms using their own unit system. One method of accomplishing this is by employing a process for equating the different unit systems. Employing a ratio or other formula, the bids of two or more merchants can be compared on a relatively equivalent basis. In such a case the system could determine which of two bids is more favorable and translate the bid of one merchant into the unit system of the other merchant so that the other merchants can bid using their unit system.

A second method for accomplishing this task normalizes, averages, or otherwise computes a "middle ground" between the unit systems of the different merchants. A new unit system is synthesized that can be used by all of the merchants (without the conversions discussed in the paragraph above) which is an amalgamation of two or more unit systems. Again, as with all of the other methods and embodiments discussed herein, this embodiment of the invention can be applied in connection with any of the other embodiments of this invention, and in connection with any sales method or format.

Third Embodiment

Another embodiment of the present invention provides for conducting an online auction whereby merchants can bid on a pool of customers who are seeking totally different products. This method employs algorithms and formulae similar to those described above. One method of accomplishing this is to determine a ratio similar to the Term Ratio discussed above by creating a Bid Unit and determining the Unit Value for one product, and by creating Bid Units related to the second product or service that have the same Unit Value. For example, merchants that sell both apples and oranges can determine a ratio based the value of one orange to one apple, and can therefore bid on a pool of customers that include purchasers of apples only, purchasers of oranges only, or purchasers of both apples and oranges. In the same way, car dealers could bid on a pool that includes customers who wish to purchase a vehicle with numerous options and customers who wish to purchase a base model of the same vehicle.

Fourth Embodiment

In accordance with another embodiment of the present invention, an auction using one or more pooling processes referred to above involves multiple stages of bidding in which two or more different Preferred Program Terms are bid upon for each pool of customers. The following continues with the credit card example to demonstrate an auction with two or more bidding stages.

In the application process, the customer ranks in order of importance a list of any number of Program Terms. The system then forms a suitable number of pools of applicants containing customers who have ranked the same Program Term first (a "Primary Preferred Program Term").

The lender calculates an offer for each customer within a pool, and aggregates all offers within a pool into one offer which applies to the entire pool. In doing so, the lender pays special attention to the first Preferred Program Term in which the pool is interested. For example, if the Preferred Program Term is a low introductory APR pool, the lender will determine the lowest introductory APR it can offer.

In the first stage of bidding, lenders bid on the Primary Preferred Program Term for each pool. A predetermined number of the highest bidders (e.g., three bidders) progress to the second bidding stage wherein the lenders continue to bid on the Primary Preferred Program Term (previously bid on in the first stage), and/or certain other Program Terms that the customers have indicated as important. It will be appreciated that the auction may involve more than two stages, and may be used in combination with one or more of the other embodiments discussed herein.

The bidding process may also include two or more additional auction stages or rounds (or, a "stage"). As used in this discussion an auction "stage" is in effect one full auction related to one or more Preferred Program Terms. In multiple stage auctions, a full bidding session, or stage, is conducted one or more different Program Terms. Upon completion of such bidding session and second full bidding session is conducted on one or more different Program Terms. At this point, the customers can be pooled and bid on together applying the Term Ration method or any other such method.

Figure 6:
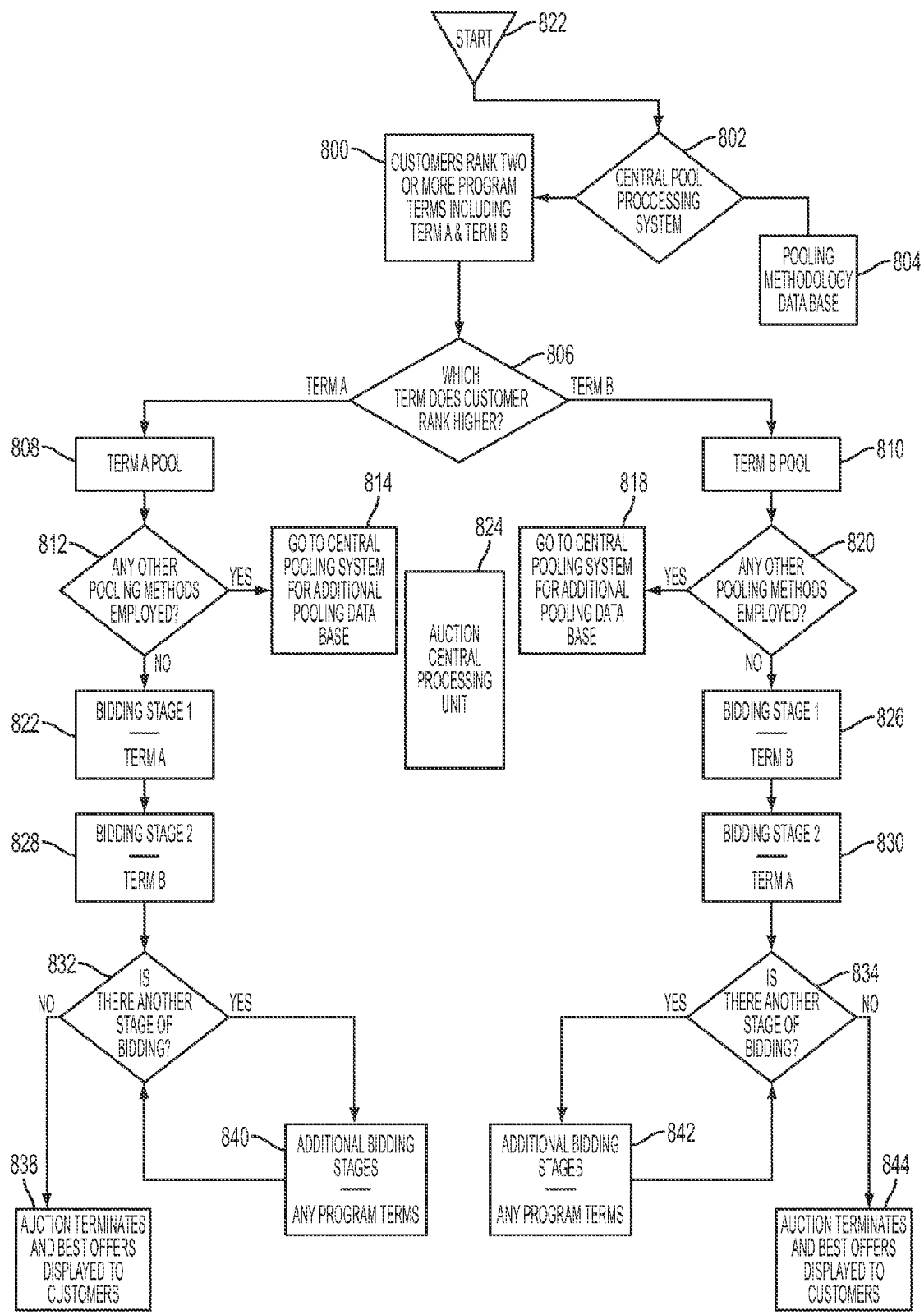
FIG. 6 is a flowchart showing an exemplary auction incorporating multiple stages.

FIG. 6 illustrates one method for practicing this embodiment of the invention. It is to be understood that the purpose of FIG. 6 is to illustrate the "stage" aspect of the invention, and therefore does not include many of the steps that may ordinarily be included in an auction, such as those depicted on FIG. 3. It is intended that such missing steps be incorporated into FIG. 6 by reference, if applicable.

Referring now to FIG. 6, at step 800 each customer has ranked two or more Program Terms. For simplicity, this example only involves two different Program Terms (i.e., Term A and Term B), however, it should be understood that this system can apply to a number of Program Terms. At step 806 the customers are pooled into either the Term A Pool (at step 808) or the Term B Pool (at step 810), based on how they ranked those Program Terms.

At steps 812 and 820, the central pooling system 802 is queried to determine whether the customers in each of Pool A and Pool B will be further divided using another pooling system. If so, at steps 814 and 818, data is routed to central pool processing system 802 where the pooling is employed, after which, the new pools are returned to step 812 and 820, as applicable, to determine if yet another pooling system will be employed. If not, at steps 822 and 826, the first bidding stage commences.

Merchants bidding on Pool A will bid on Program Term A at step 822. Merchants bidding on Pool B will bid on Program Term B at step 826. At the end of bidding stage one, there are a number of options. For example, all the merchants can proceed to the next stage, or a certain number of merchants with highest bids may proceed to the next stage. At this stage the program offering on which bidding will commence will be as changed by the first stage of bidding. Therefore, Pool A will receive and retain the benefits of the first stage bidding on Term A, and will now reap the benefits of competitive bidding on Term B.

At steps 828 and 830, the second bidding stage commences. Merchants bidding on Pool A will bid on Program Term B at step 828. Merchants bidding on Pool B will bid on Program Term A at step 830. It should be understood that the pools of customers may be combined at this point and bid upon together, depending, of course, on the characteristic and other pooling methods previously employed.

Upon termination of stage 2 bidding, at steps 832 and 834, the auction central processing unit 824 is queried to determine if a another stage of bidding will occur (and if so, which terms will be bid upon). If so, at step 840 the additional bidding stage commences, and auction central processing unit 824 is queried again at steps 832 and 834. This loop continues until there are no more stages in the auction, at which time, at steps 838 and 844, the auction terminates and the results are displayed to the merchants and customers.

It is to be understood that two or more different Program Terms can be bid upon in the same stage. In addition, the same Program Terms can be one of the terms bid upon in a later stage.

Again, as with all of the other methods and embodiments discussed herein, this embodiment of the invention can be applied in connection with any of the other embodiments of this invention, and in connection with any sales method or format.

Fifth Embodiment

In accordance with another embodiment of the present invention, a "fictional" auction takes place using one or more of the above-described methods. More particularly, merchants bid on "ghost" pools containing a designated number of hypothetical customers. The winning bidder receives the right, for example, to obtain the business of a previously agreed upon number of real customers who have previously applied, or in the future apply, for the applicable product. As another example, the winning bidder might win the business of all customers signing up for the particular product or service during a certain time frame.

This embodiment effectively shortens the time period which a customer must wait for the results of an auction conducted under the above-described auction methods. Presumably, the initial customers that sign up to purchase a product through the system need to wait while others sign up and are assigned to the pool. This method allows customers to immediately purchase products for prices obtained through use of the auction format, without having to wait while others sign up.

This embodiment of the invention can also be used without the above-described pooling methods. Customers who use existing customer-aggregation Web sites suffer from the same plight described in the preceding paragraph. To obtain the benefit of group buying power, customers must sign up and wait as a meaningful number of other customers sign up to purchase the same product. These customers watch the price slowly decrease as more people sign up. This ghost auction format can be employed to eliminate that wait, and can be applied to any product or service sold in an auction or through any other sales format.

Sixth Embodiment

In accordance with another aspect of the present invention, potential purchasers of a product can adjust one or more variable Program Terms or features of the product such that an applicable adjustment to the price, or the equivalent thereof, is automatically effected.

A calculation of the necessary price adjustment that must be made to reflect a change to a Program Term is not difficult where there is a limited number of changes that can be made to the Program Term, and where there is a limited number of Program Terms whose values are not tied together or otherwise dependent. For example, in the sale of an automobile, there is generally a limited number of options that may be added or eliminated from the base model of the vehicle. Assuming the required adjustment to the price is based solely on the lost or added value to the dealer, the price change is easily calculated by referring to a price list. The calculation is easy because the options themselves are generally not variable, there being only one way to change the option; i.e., you either pay the price for the entire air conditioning unit, or you do not receive the unit. However, where a product offering has a variable term, such as interest rate, determining how an adjustment to a Program Term should affect the price is more difficult.

There may be numerous possible increments by which such a Program Term could be adjusted. To illustrate, assume an Internet service provider has a base service offering which includes twenty free "online minutes" for new customers. Assuming the free minutes term is variable up to 1,000 minutes, there are 980 different ways to adjust the Program Term, compared to one way to change most options in an automobile.

Figure 4:
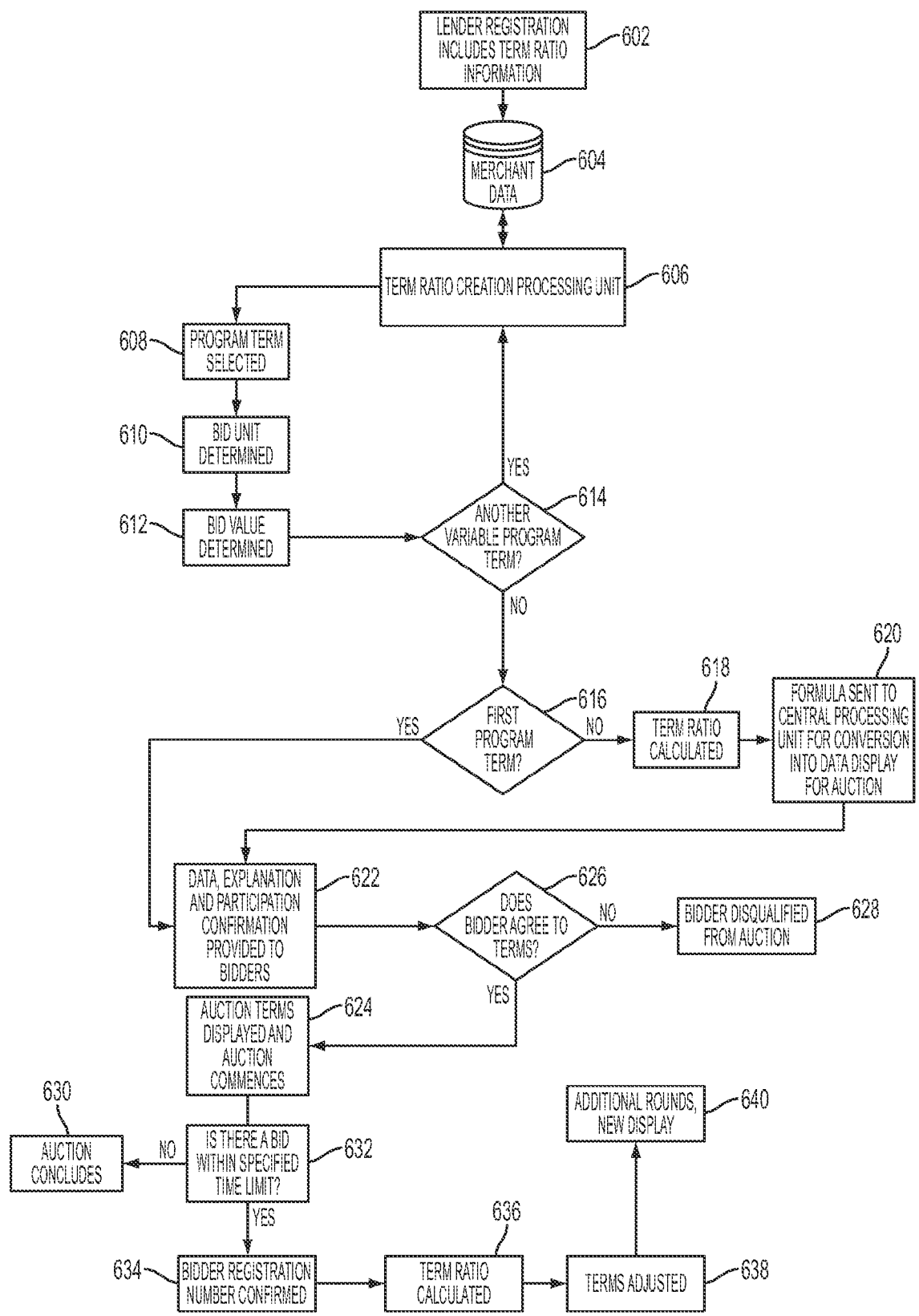
FIG. 4 is a flowchart depicting an exemplary method of calculating term ratios.

Referring now to FIG. 4, an exemplary method of computing and assembling Term Ratio information will now be described. In general, merchant data 604 is populated by Term Ratio information computed by Processing Unit 606 or via Term Ratio information included in the Lender registration (602).

First, in step 608, a Program Term is suitably selected (step 608). The Bid Unit and Bid Value are then determined (steps 610-612). The system then queries whether there is another variable Program Term (step 614). If not, the system continues with step 616 and determines whether the term is the first Program Term. If so, processing continues with step 622; if not, the Term Ratio is calculated (step 618), and the formula is sent to the ACPU for conversion into data displayed during the auction (step 620). In any event, the system continues with step 622, where data and confirmation information are sent to each bidder. If the bidder does not agree to the terms (step 626), the bidder is disqualified from the auction (step 628). If the bidder agrees to the terms, the auction terms are displayed and auction commences (step 624).

During the auction, when bids are received, the system first queries whether the bid is within the specified time limit (step 632). If not, the auction concludes (step 630). If the bid falls within the time limit, the bidders identity is confirmed (step 634), the Term Ratio is calculated (step 636), and the Terms are suitably adjusted (step 638). Processing then continues the auction at step 624 (equivalent to steps 542 and 524 in FIG. 3).

Figure 3:
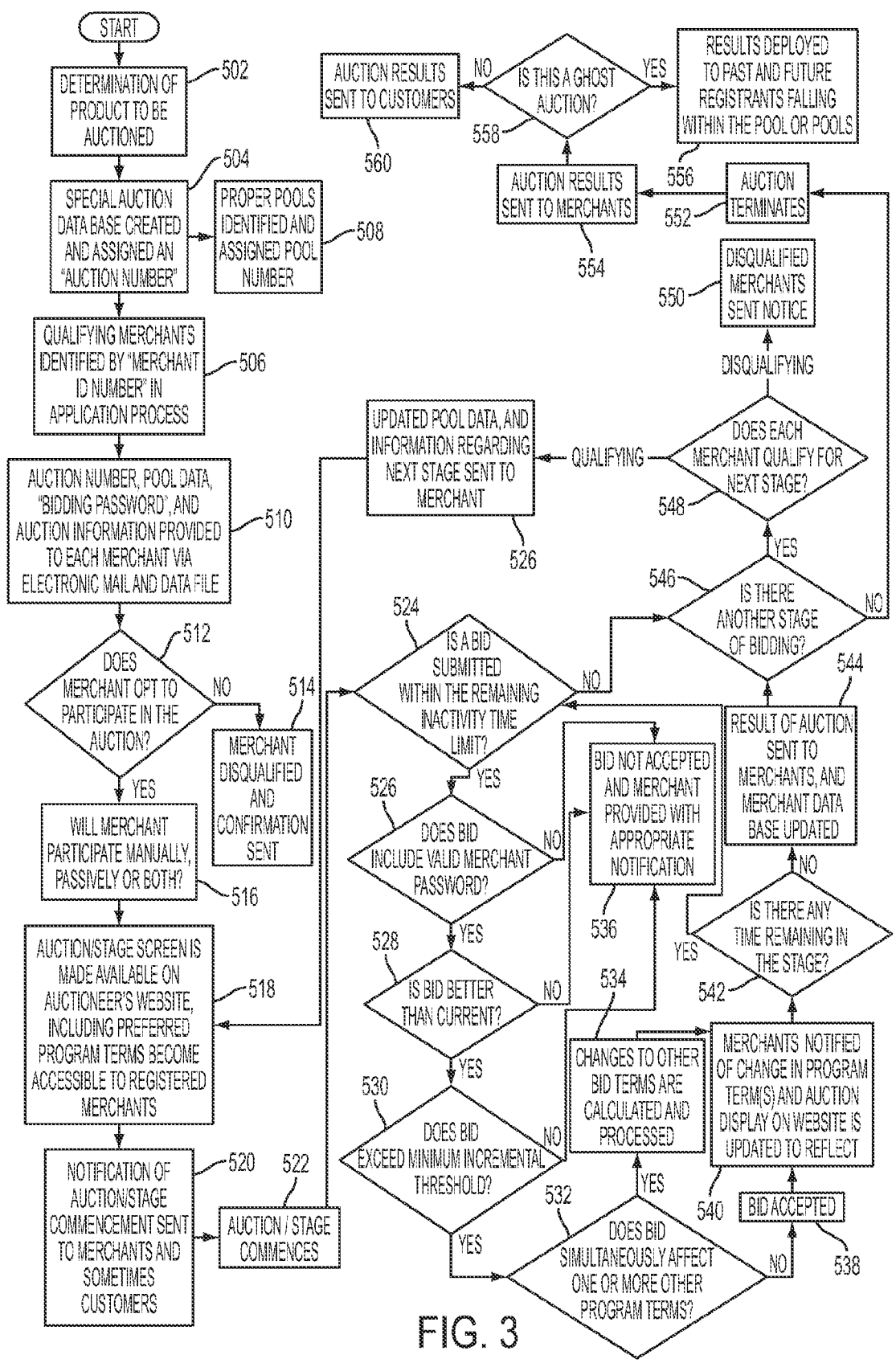
FIG. 3 is a flowchart depicting an exemplary method of conducting an auction.

It will be appreciated that suitable verification steps and the like may be incorporated into this process as discussed in FIG. 3 above.

The calculation becomes more difficult where there is more than one variable Program Term, and where the change to one Program Term affects not just price, but a second Program Term. For example, there could be a situation where a change to a particular Program Term must result in a corresponding change to one or more other Program Terms. Therefore, each adjustment may result in two or more corresponding adjustments. This invention is intended to encompass such calculations and variables.

The process is further complicated by principles such as diminishing returns, because the value of the same incremental change may be variable, and therefore not easily calculated. For example, the addition of 100 free minutes to increase the number of free minutes from 20 minutes to 120 minutes may not equate to the loss of value caused by, or the loss of value which the merchant wishes to assign to, the addition of 100 free minutes to increase the number of free minutes from 800 to 900 free minutes. This invention is intended to encompass such calculations and variables.

This aspect of the invention may be demonstrated by the following example. First, as described above, a variable Program Term is segmented into numeric or other increments (a "Unit"). For example, if you assume the minimum increment that a customer could adjust a variable deductible on a fire insurance policy is five dollars, each Unit equals five dollars. Next, the value of the Unit, which is typically monetary, is calculated for and/or assigned to the Unit (a "Unit Value"). Usually the Unit Value is equal to the increase or loss of value (or which the merchant is willing to forego) that results from changing the applicable Program Term by one Unit. However, the Unit Value can also be based on other factors such as marginal cost, marginal revenue, or any other financial/non-financial metric. The increase or loss of value can be fixed, step function (e.g., increases more or less based on certain break points, or based on an algorithm/formula). Therefore, the Unit Value can be a negative number depending upon whether an increase or a decrease in the number of Units causes value or loss. For purposes of this discussion the first Program Term is known as Term X ("X-Term"), and the Unit calculated for the first Program Term is designated as an "X-Unit". Assuming the insurance company loses $1.00 of profit for each $5.00 decrease in the deductible, the X-Unit Value is $1.00, or 1. Based on the foregoing, determining the amount by which an adjustment to a Program Term should adjust the price is done by multiplying the number of Units by which the deductible was changed by the Unit Value. Therefore, a decrease in the deductible by $500 (from $1,000 to $500) automatically causes a $100 increase in the premium. A $500 decrease in the deductible constitutes 100 Units ($500/$5), which multiplied by the Unit Value ($1.00), equals $100.

If a second variable Program Term is included, a similar process is employed to segment the possible incremental adjustments of the second Program Term ("Y-Term") into Units (each a "Y-Unit"). In some cases, the Y-Term, Y-Unit, or Y-Unit Value may be linked to the X-Term, X-Unit, or X-Unit Value (e.g., Y-Term is correlated in some way to changes in the X-Term). For example, in the above example, every $100 decrease in the X-Term may require a $200 decrease in the amount of insurance (the Y-Term). Likewise, every X-Unit decrease (equal to $5 in this example) results in a $10 decrease in the Y-Term (or decrease of 2 Y-Units if 1 Y-Unit equals $5 of Y-Term). In such cases where an X-Unit and a Y-Unit are correlated, the system then determines the number of Y-Units by which the Y-Term must be adjusted for a change in X-Units so that the net changes in the Y-Unit Value and the X-Unit Value are appropriate.

The "Y Multiplier" is the number of Y-Units that must change for a 1 X-Unit increase. In the above example, a decrease of 1 X-Unit, which equals $5 of X-Term, requires a 2 Y-Unit decrease, which equals $10 of Y-Term. The Y Multiplier is therefore 2, as 1 X-Unit equals 2 Y-Units. The "Term Ratio" equals the ratio of X-Units to Y-Units (or 1/Y Multiplier: ½ in this example). The Y-Multiplier and Term Ratio can be fixed values, variable (based on ranges—i.e., Y-Multiplier is 2 for a 1 to 10 X-Unit change, and is equal to 3 for a 11+X-Unit change), or formula (i.e., Y-Multiplier=x^2). There can be any number of Multipliers used to link any number of Terms and Units together. Multiple Units can also be incorporated into any one formula (i.e., Y Multiplier could be equal to X^2+0.5Z). In cases where the X-Term and Y-Term are unrelated, there is no Y Multiplier applied.

By employing the "Y Multiplier", the change to one or more Program Terms can trigger required changes in one or more different Program Terms. Therefore, it can be determined how much the price should decrease or increase upon a change to one or more Program Terms. If no Y Multiplier is applicable, the increase or decrease in price will be the net total of the Unit Values.

It is important to note that, calculating a Unit should be in a manner that makes sense in connection with that Program Term. Not all Program Terms are themselves represented by numerical values. Therefore, breaking down the possible adjustments to such Term may not be as simple. For example, a deductible is simple to convert into Units because the deductible is itself numeric. There are, however, adjustable non-monetary Program Terms such as product features and services. For example, if the Program Term is customer support for a product, and if the base value of the Program Term was support coverage for 5 days a week, 9 AM to 5 PM, a one Unit increase will change the Program Term to 5 days a week, 24 hour coverage, while a 2 Unit increase will change the Program Term to 24×7 support. In these examples, the Unit Value would be the cost (or other metric) associated with changes in Program Term/Units.

Take for example a health insurance plan offering, and assume the base plan includes the following variable Program Terms:

| | |
|---|---:|
| Monthly Premium for first insured | $300 |
| Monthly Premium for added insured | $200 |
| Percent paid for visit to non-network doctor | 50% |
| Prescription drug co-payment | $10 |
| Number of hospital days paid for child birth | 3 |

First, one of the Program Terms, or the X-Term, is used as a starting point for calculating Unit Value. Assume that the minimum change to the payment percent permitted is 5% and that the merchant assigns a $5 value to each 5% change. Therefore, the X-Unit=5%, and the X-Unit Value is $5.00. Using, as an example, the formula discussed above—Number of Units×Unit Value=price adjustment, a net 10% increase from 50%-60% will yield a $10 increase in the monthly premium. Assume the prescription drug co-payment is Y-Term, and that the merchant determines that the minimum incremental change to the co-pay amount is $1.00, and designates that each $1.00 change to the co-pay changes the premium by $10.00. Therefore, the Y-Unit is $1.00, and the Y-Unit Value is $10.00. Now assume that the insurer designates that each one day hospital stay (Z-Unit) requires a $20 change to the monthly premium (Z Unit Value). Now assume that monthly premium for an added insured is the W-Term and that the W-Unit is 1 (i.e., increases by 1 for each added person) and that the W-Unit Value is $200. However, the W-Unit and X-Unit are linked to the extent that for every 1 W-Unit increase, or $200, the X-Unit decreases by 2, or $10. However, the opposite is not true in that the X-Unit can be changed without any change to the W-Unit.

| | W | X | Y | Z |
|---|---|---|---|---|
| Unit | 1 | 5% | $1 | 1 |
| Unit Value | $200 | $5 | $10 | $20 |
| X Multiplier (based on change to W) | | 2 | | |

To keep price constant, a one Unit increase to Y=2 Unit decrease to X or a 0.5 unit decrease to Z. Of course, the price can be variable, in which case all values of W, X, Y, and Z can be adjusted as appropriate. Note that if W-Unit is increased by 1, X-Unit will automatically be decreased by 2. Also note that X-Unit can be decreased further beyond this per the customer's desire.

Seventh Embodiment

In accordance with another embodiment of the present invention, a point system is provided whereby a customer can custom-tailor a product offering. More particularly, a certain number of points (the "Program Points"), each having the same or similar monetary or other value, are allocated to the customer. The customer can then use the Program Points to change Program Terms contained in the Base Offer by one or more Units. The Program Term would be changed by the number of Units that have an aggregate Unit Value equal to the number of Program Points allocated to such Program Term by the customer. This system may be used with or without the auction format, and may employ calculations and other methods similar to those discussed above.

Generally, the use of each Program Point, no matter to what Program Term it is applied, would cause the same or substantially the same effect to the merchant's profit. The number of Program Points required to change different Program Terms by one Unit could be determined by the amount of loss to the Seller caused by changing the Program Term by such Unit (i.e., the number of Program Points that equal the monetary loss to the seller by changing the Program Term).

Therefore, if a customer starts with 100 Program Points, no matter how he or she allocates them to change the various Program Terms contained in a Base Offer, in the end, the merchant will realize the same or comparable value, i.e., the merchant will make substantially the same profit (or loss) by selling the product offering to such customer. The following presents one illustration of how this embodiment of the invention may operate in a network environment.

After submitting an application in the manner contemplated by the Customer Data Entry Module 111 shown in FIG. 1., the customer's information would be processed and a Base Offer would be created for the applicable product offering. For products, the base offer would likely be the same for any potential customer. For insurance, financial, or any other services, the Program Terms of which are based on certain characteristics of each customer, the computing system may need to calculate a different Base Offer for each customer.

The Base Offer and number of Program Points available to the customer would preferably be displayed to the customer. The display would suitably depict each variable Program Term and any other applicable Program Terms. The customer would use his or her mouse or other input device to add Program Points to, or subtract Program Points from, different Program Terms, thereby causing the applicable change in Units to such Program Terms. Program Points taken from a Program Term would be added to the number of Program Points available for allocation. It may be possible for customers to take Program Points out of certain Program Terms as set in the Base Offer; i.e., to decrease a term as originally set in the Base Offer, and use the Program Points gained elsewhere.

Figure 5:
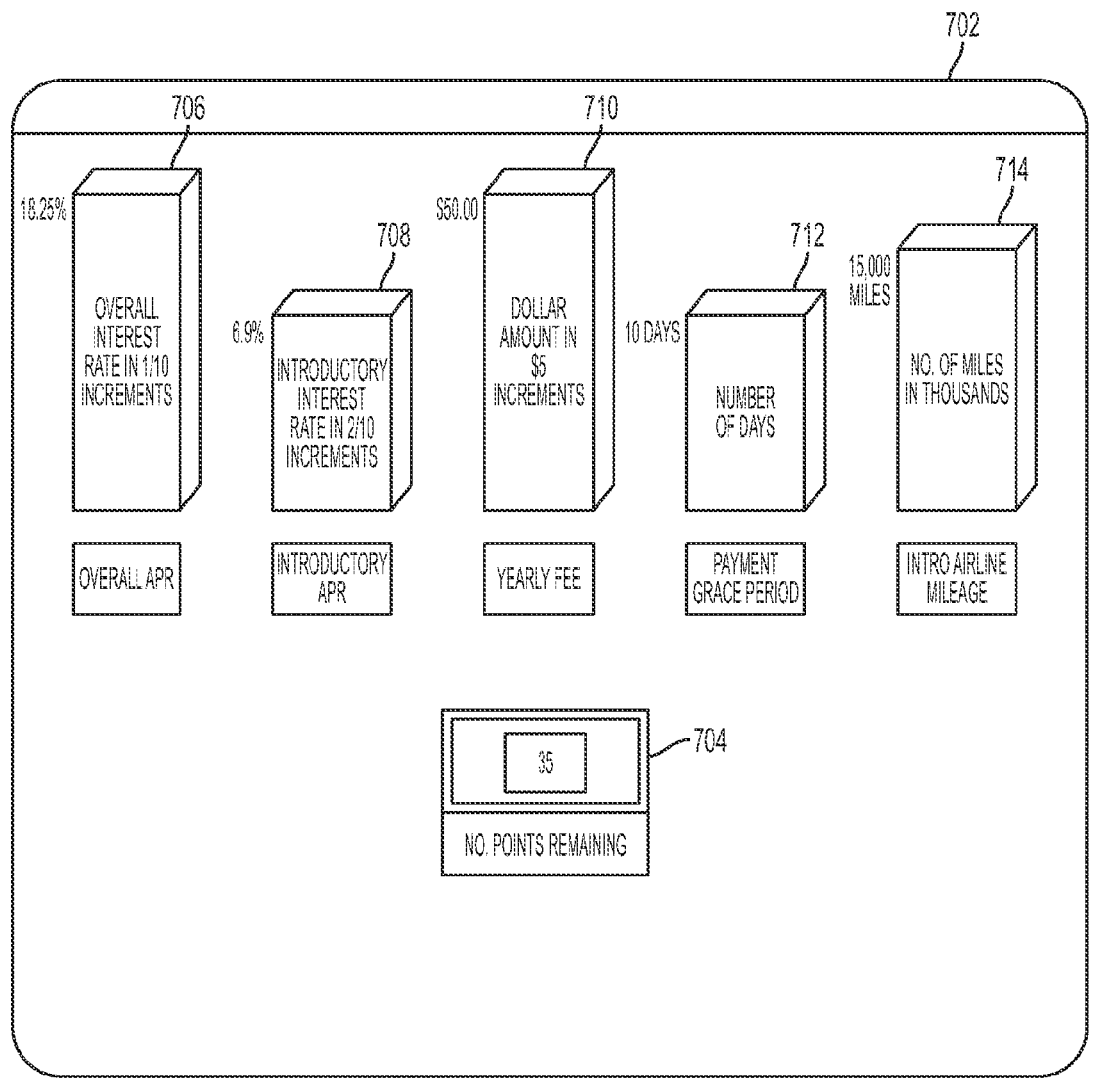
FIG. 5 shows an exemplary graphical user interface for allocating points in accordance with one aspect of the present invention.

The Program Terms may be depicted in any convenient form, e.g., graphically and/or numerically. In such a case, as Program Points are added to or subtracted from the Program Terms, the graphical display depicts the change in the Program Term. Referring momentarily to FIG. 5, for example, a display 702 may include a bar graph comprising a number of bars 706-714 configured to graphically represent the value of respective Program Terms 716-724. The number of remaining points is suitably displayed (e.g., in a rectangular region 704) and reflects changes automatically—along with the dimensions of bars 706-714—as points are allocated to the various Program Points. The display may also include the equivalent of a price list that states the number of points required to change a Program Term by one Unit.

Once again using the credit card program example, assume a customer is presented with 100 Program Points and the following Base Offer:
  Introductory APR—4.9%
  Intro APR period—3 months
  Overall APR—18.0%
  Yearly fee—$50
  Frequent Flier mileage sign up awards bonus—500 miles
  Payment grace period—14 days First, the customer may want to decrease the Intro APR by 2.0% to 2.9%. Assuming that, through the algorithms and other formulae discussed above, it costs 15 Program Points to reduce the intro APR by 1.0%, the total change to Intro APR will cost 30 Program Points. Perhaps the customer wants to lower his yearly fee. Next, the customer may want to reduce the yearly fee. Assuming the yearly fee must be decreased in minimum increments of $10 and that each such minimum decrease costs 6 Program Points, the customer can allocate 30 Program Points to the yearly fee to reduce it to $0. With 40 allocable Program Points remaining, the customer next decides to increase his frequent flier benefits. Assuming the lender is willing to increase the sign up mileage bonus to up to 4,000 miles, and that any increases must be in minimum increments of 500 miles, and each such increment costs 5 Program Points, the customer could allocate 20 Program Points to increase his mileage bonus by 2,000 bonus miles. With 20 remaining Program Points, the customer decides to lower the overall APR. Assuming APR can be reduced in minimum increments of 1%, that the minimum APR allowable is 13%, and that each 1.0% decrease in APR will cost 3 Program Points, the customer can allocate a maximum of 15 Program Points to overall APR to reduce it by 5% down to 13%. The customer finally decides to allocate the 5 remaining Program Points to increase the mileage bonus by an additional 500 miles. The end customized offer would look as follows:
  Introductory APR—2.9%
  Intro APR period—3 months
  Overall APR—13.0%
  Yearly fee—$0
  Frequent Flier mileage sign up awards bonus—3,000 miles
  Payment grace period—14 days As illustrated in the above example, limits may also be placed on the amount a particular Program Term may be changed through Point allocation. Using the credit card example, a credit card company cap the lowest permitted APR level at some predetermined value, e.g., 9.9%.

In addition, the number of Program Points assigned to a particular customer can vary depending on how valuable the customer is to the seller. In credit card sales, very desirable customers may be assigned more Program Points than less desirable customers—or such valuable customers may be assigned the same number of Program Points, but the incremental changes of various Program Terms would require fewer Program Points.

This method can be used alone or in connection with an auction and/or any one or more of the other bidding methods discussed above. That is, this method is not a bidding method per se; however, it can be used in connection with any auction, or any other sales format. The point system described in this section of this patent application can be employed, among other ways, (1) by having merchants participating in an auction bid on the number of Program Points they wish to allocate to a particular customer or pool (such as the pools discussed in the first part of this document)—with the merchant bidding the most Program Points winning the right to obtain the customers in that pool, or (2) outside the auction format, where the seller determines the number of Program Points it wishes to allocate to a particular customer or pool of customers without having to bid. As in prior sections of this patent application, much of the discussion in this section of this patent application has focused on lenders offering credit cards; however, the credit card context is used only as an example, and is not intended to limit the invention. Rather, the method shall apply to any product offering.

On of the distinguishing features between this embodiment and the sixth embodiment of the invention, is that in the sixth embodiment, generally, because the Program Terms are tied together, changes to a Program Term automatically effects at least one other Program Term. In this method, however, a change in one Program Term will not always cause a change in other Program Terms because most Program Terms are tied to the points.

Pooling Process

Figure 2:
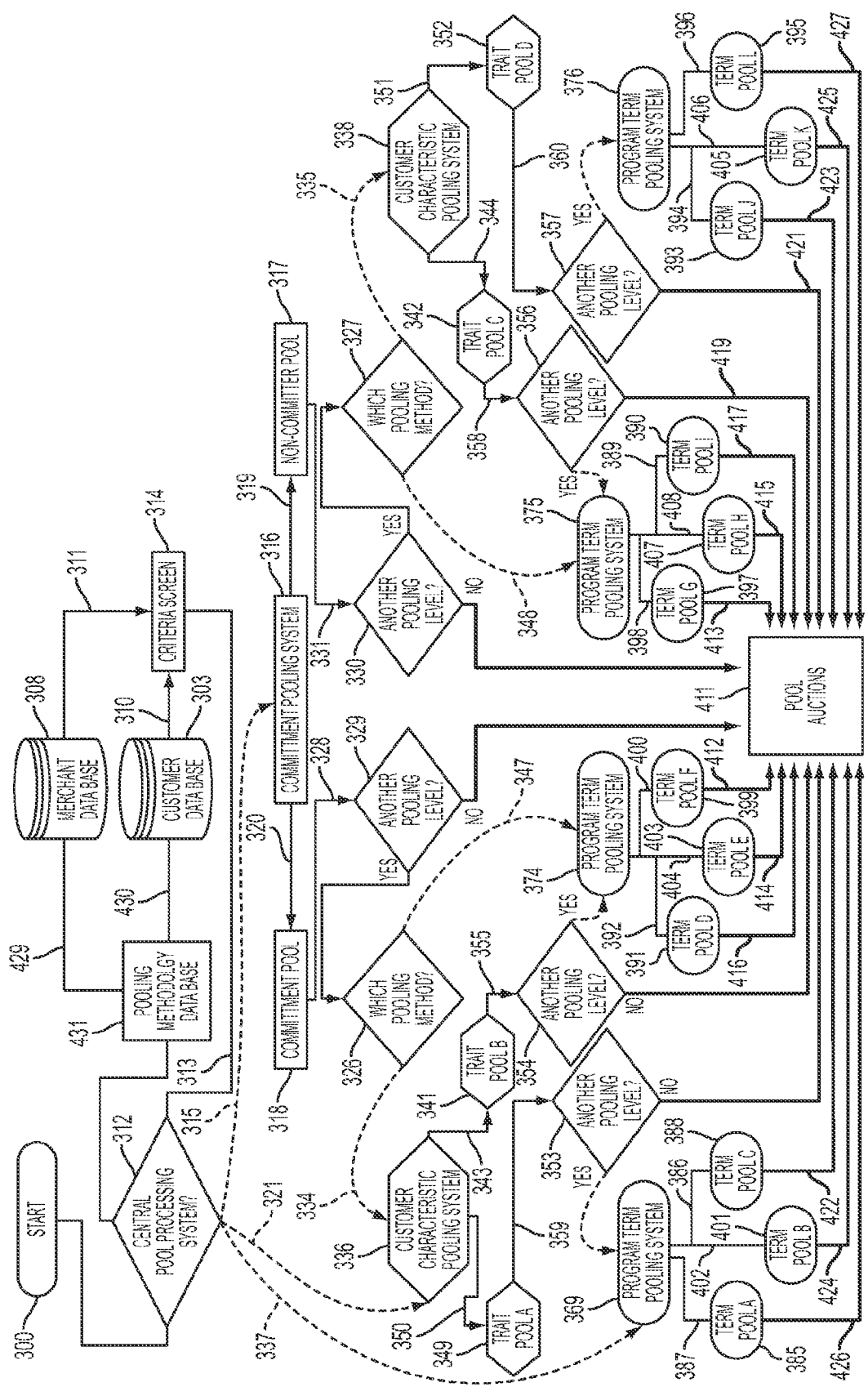
FIG. 2 is a flowchart depicting an exemplary method of pooling customers.

Referring now to FIG. 2, the operation of Pooling Module 116 is demonstrated for one auction scenario. After customers have been screened through the lender criteria at step 314, customer information at 312 is sent to be processed through one or more pooling methods which may include Commitment Pooling 316, Customer Characteristic Pooling 336 & 338, and/or Program Term Pooling 369, 374, 375 and 376, through which customers are divided into two or more customer pools.

The pooling process is managed by central pool processing system 312, which operates using information contained in the pooling methodology database 431, the merchant database 308, and the customer database 303, each of which is directly linked to central pool processing system 312. Customer database 303 contains data on each of the customers, which is used to generate a customer profile which is an electronic piece of information containing all criteria of customer relevant to the applicable auction, and assigns an identification number to the customer profile so that the identity of the customer remains anonymous to the bidders.

The customer profiles may include any suitable demographics, specific customer traits, or other variables needed to employ the pooling processes for such customer. The pooling methodology database 431 stores a predetermined set of pooling rules for an auction. The rules designate, among other things, the pooling system(s) to be used, the order in which such systems are to be used, the number and parameters of each of the pools to be created through the pooling systems, and the information contained in the customer profile and/or merchant profile to be analyzed to determine pool assignments for each customer. The rules may be created in a number of ways, including, but not limited to, via a computer process or via technical personnel.

Merchant database 308 preferably contains data on each of the merchants, which is used to generate a merchant profile, which is comparable to a customer profile. Each merchant is also preferably assigned an identification number, which allows merchants to participate in the auction anonymously. The merchant profiles may include pooling variables and pre-determined minimum criteria, which potential customers must satisfy, to be bid upon by the merchant.

Central pool processing system 312 processes each customer profile through the applicable pooling system. The pooling systems illustrated in this discussion include systems for commitment pool processing 316, customer characteristic pool processing 336, and program term pool processing 369. Central pool processing system 312 uses pooling methodology data base 431 to process data contained in the customer profiles and merchant profiles, and to determine to which pool each customer is preferably assigned under each pooling system.

The following example illustrates the operation of the bid-pooling module, through a hypothetical pooling of potential purchasers of auto insurance.

First, central pool processing system 312 employs the commitment pooling system 316 to pool the potential customers. At step 316, using the methodology discussed above, the central pool processing system 312 assigns customers that have pre-committed to purchase insurance to the committer pool 318, and those that have not, to the noncommitter pool 317. If at step 329 and 330 it was determined that no other pooling system should be employed based on information in the pooling methodology database, committer pool 318 and the non-committer pool 317 would become the only two pools to be bid upon in auction 411.

If at steps 329 & 330 it is determined that the customer characteristic pooling system 336 and 338 should also be employed based on information in the pooling methodology database, the customers in the committer pool 318 would be sent to customer characteristic pooling system 336, through step 334, and the customers in committer pool 317 would be sent to customer characteristic pooling system 338 through step 335.

Now assume the customer characteristic pooling system is employed to divide the commitment and non-committer pools into two further pools of applicants based on information in the pooling methodology database—those who are under 21, and those who are older than 21. The customers in the committer pool 318 would be assigned to Trait Pools A 349 or Trait Pool B 341. Conversely, the customers in Non-committer pool 317 would be assigned to either Trait Pool C 342, or Trait Pool D 352. Following this pooling, if it was determined (at steps 353, 354, 356 and 357) that no additional pooling system would be employed, Trait Pool A 349 (through steps 359 and 353), Trait Pool B 341 (through steps 355 and 354), Trait Pool C 342 (through steps 382 and 419), and Trait Pool D, would become the four final pools to be communicated to and bid upon in auction 411.

If it is determined that the program term pooling system should be employed based on information in the pooling methodology database, the customers in the Trait Pools would be sent to the program term pooling systems 369, 374, 375 and 376 as applicable.

Assuming the program term pooling system is employed to separate the customers in each of the four trait pools into three pools based on Preferred Program Terms (monthly premium, deductible & amount of coverage) the pool processing system would, in the manner discussed above, subdivide the customers in each of the four Trait Pools A, B, C & D into one of three pools. This would result in the creation of 12 different pools, including Term Pool A 385, Term Pool B 401, Term Pool C 388, Pool D 391, Term Pool E 403, Term Pool F 399, Pool G 397, Term Pool H 407, Term Pool I 390, Pool J 393, Term Pool K 405 and Term Pool L 395. Each of these 12 Term Pools would be the final pools bid upon in auction 411.

This method is intended to apply in conventional auctions with a single stage or auctions with multiple stages. It allows customers to be split into broad or very narrow pools as required. In certain circumstances, for example the insurance industry, there are numerous variables considered in determining the various terms of an insurance policy. These numerous variables make it very difficult to bid on pools of customers. By employing this pooling process, customers can be separated into very narrow pools, so that an insurance company can treat them as being in equal positions. This allows insurance companies to seek the business of numerous customers in one shot. As discussed elsewhere in this application, this principle applies to the sale of countless other products or services.

Although the invention has been described herein in conjunction with the appended drawings, those skilled in the art will appreciate that the scope of the invention is not so limited. For example, throughout this document, any reference to a "product" or "product offering", is meant to refer to both a product offering, and/or a service offering, or a combination thereof. Some of the embodiments of the invention, or portions thereof, are presented in the context of the finance industry (e.g., credit card issuance). The use of particular examples should not be construed as limiting the inventive concept to any particular industry, any particular product or service, or otherwise. Furthermore, although this application generally refers to a dynamic online bidding format, this invention is intended to apply to any auction format, whether over the Internet, via dynamic bidding, e-mail bidding, or any other form of bidding. The invention applies to consumer-to-consumer, consumer-to-business, and business-to-business transactions; for example, large institutions can bid on pools of different types of debt being sold by financial institutions, or companies may bid on pools of businesses seeking particular mobile communication services, Internet access, or otherwise. These and other modifications in the selection, design, and arrangement of the various components and steps discussed herein may be made without departing from the scope of the invention as set forth in the appended claims.

What is claimed is:

1. A computer-implemented method for conducting an on-line auction of the type wherein a plurality of customers may receive, via said auction, offers of products supplied by one of at least two merchants, wherein the method is implemented in a computer system comprising one or more processors configured to execute one or more computer program modules, said method comprising:

executing, on the one or more processors of the computer system, one or more computer program modules configured to obtain, over a network, customer information from said plurality of customers, wherein said customer information comprises:

a first set of customer information corresponding to a first customer, the first set of customer information indicating that the first customer has selected a first indication of product preference;

a second set of customer information corresponding to a second customer, the second set of customer information indicating that the second customer has selected the first indication of product preference; and a third set of customer information corresponding to a third customer, the third set of customer information indicating that the third customer has selected a second indication of product preference that is different from the first indication of product preference;

executing, on the one or more processors of the computer system, one or more computer program modules configured to automatically group the plurality of customers into pools based on customer selections of the indications of product preference indicated in the sets of customer information corresponding to the individual users, wherein the pools comprise:
- a first pool of customers that includes customers corresponding to customer information sets that indicate customer selection of the first indication of product preference such that the first pool of customers includes the first customer and the second customer; and
- a second pool of customers that is distinct from the first pool of customers, the second pool of customers including customers corresponding to customer information sets that indicate customer selection of the second indication of product preference such that the second pool of customers includes the third customer;

executing, on the one or more processors of the computer system, one or more computer program modules configured to obtain, over said network and prior to the first set of customer information, the second set of customer information, and the third set of customer information being obtained, from individual ones of said at least two merchants bids to provide offers of products to customers in the plurality of customers, wherein obtaining bids to provide offers of products to one or more pools of customers comprises obtaining bids to provide offers of products to ghost pools of customers into which future customers will be grouped;

executing, on the one or more processors of the computer system, one or more computer program modules configured to select bids from the obtained bids to provide offers of products to customers from the plurality of customers, wherein individual bids correspond to individual pools of customers such that the bids include a first bid that corresponds to the first pool of customers and a second bid that corresponds to the second pool of customers, and wherein the selection of the bids comprises:

executing, on the one or more processors of the computer system, one or more computer program modules configured to individually notify customers of the corresponding pools such that:
- based on the selection of the first bid, the customers in the first pool of customers receive over the network offers corresponding to the first bid, and
- based on the selection of the second bid, the customers in the second pool of customers receive over the network offers corresponding to the second bid.

2. The method of claim 1, further comprising executing, on the one or more processors of the computer system, one or more computer program modules configured to provide to the two or more merchants customer information that corresponds to the pools of customers such that:
- the two or more merchants are provided with customer information that corresponds to the first pool of customers, such customer information including customer information from the first set of customer information and customer information from the second set of customer information, and
- the two or more merchants are provided with customer information that corresponds to the second pool of customers, such customer information including customer information from the third set of customer information.

3. The method of claim 2, wherein the customer information from the first set of customer information and from the second set of customer information that is provided to the two or more merchants comprises the first set of one or more characteristics.

4. The method of claim 3, wherein the first set of characteristics comprises demographics.

5. The method of claim 4, wherein the demographics comprise one or more of geographical location, income, occupation, sex, or age.

6. The method of claim 3, wherein the first set of characteristics comprises information related to historical behavior.

7. The method of claim 6, wherein the information related to historical behavior comprises credit information.

8. A computer-implemented method for conducting an on-line auction of the type wherein a plurality of customers may receive, via said auction, product offerings from one of at least two merchants, wherein the method is implemented in a computer system comprising one or more processors configured to execute one or more computer program modules, said method comprising:

executing, on the one or more processors of the computer system, one or more computer program modules configured to obtain, over a network, customer information from said plurality of customers, wherein said customer information comprises:
- a first set of customer information corresponding to a first customer, the first set of customer information indicating that the first customer has selected a first indication of product preference;
- a second set of customer information corresponding to a second customer, the second set of customer information indicating that the second customer has selected the first indication of product preference; and
- a third set of customer information corresponding to a third customer, the third set of customer information indicating that the third customer has selected a second indication of product preference that is different from the first indication of product preference;

executing, on the one or more processors of the computer system, one or more computer program modules configured to automatically group the plurality of customers into pools based on customer selections of the indications of product preference indicated in the sets of customer information corresponding to the individual users, wherein the pools comprise:
- a first pool of customers that includes customers corresponding to customer information sets that indicate customer selection of the first indication of product preference such that the first pool of customers includes the first customer and the second customer; and
- a second pool of customers that is distinct from the first pool of customers, the second pool of customers including customers corresponding to customer information sets that indicate customer selection of the second indication of product preference such that the second pool of customers includes the third customer;

executing, on the one or more processors of the computer system, one or more computer program modules configured to obtain, over said network and prior to the first set of customer information, the second set of customer information, and the third set of customer information being obtained, from individual ones of said at least two merchants bids to provide product offerings to customers in the plurality of customers, wherein obtaining bids to provide product offerings to one or more pools of customers comprises obtaining bids to provide product offerings to ghost pools of customers into which future customers will be grouped;

executing, on the one or more processors of the computer system, one or more computer program modules configured to select bids from the obtained bids to provide product offerings to customers, wherein individual bids correspond to individual pools of customers such that the bids include a first bid that corresponds to the first pool of customers and a second bid that corresponds to the second pool of customers;

executing, on the one or more processors of the computer system, one or more computer program modules configured to individually notify customers of the corresponding pools such that:

based on the selection of the first bid, the customers in the first pool of customers receive over the network product offerings corresponding to the first bid, and based on the selection of the second bid, the customers in the second pool of customers receive over the network product offerings corresponding to the second bid.

9. The method of claim 8, further comprising executing, on the one or more processors of the computer system, one or more computer program modules configured to provide to the two or more merchants customer information that corresponds to the pools of customers such that:

the two or more merchants are provided with customer information that corresponds to the first pool of customers, such customer information including customer information from the first set of customer information and customer information from the second set of customer information, and the two or more merchants are provided with customer information that corresponds to the second pool of customers, such customer information including customer information from the third set of customer information.

10. The method of claim 9, wherein the customer information from the first set of customer information and from the second set of customer information that is provided to the two or more merchants comprises the first set of one or more characteristics.

11. The method of claim 10, wherein the first set of characteristics comprises demographics.

12. The method of claim 11, wherein the demographics comprise one or more of geographical location, income, occupation, sex, or age.

13. The method of claim 10, wherein the first set of characteristics comprises information related to historical behavior.

14. The method of claim 13, wherein the information related to historical behavior comprises credit information.

15. A computer-implemented method for conducting an on-line auction of the type wherein a plurality of customers may receive, via said auction, offers of products from one of at least two merchants, wherein the method is implemented in a computer system when executed by comprising one or more processors configured to execute one or more computer program modules, said method comprising:

executing, on the one or more processors of the computer system, one or more computer program modules configured to obtain, over a network, customer information from said plurality of customers, wherein said customer information comprises:

a first set of customer information corresponding to a first customer, the first set of customer information indicating that the first customer has selected a first indication of product preference;

a second set of customer information corresponding to a second customer, the second set of customer information indicating that the second customer has selected the indication of product preference; and a third set of customer information corresponding to a third customer, the third set of customer information indicating that the third customer has selected a second indication of product preference that is different from the first indication of product preference;

executing, on the one or more processors of the computer system, one or more computer program modules configured to automatically associate the plurality of customers with pools based on customer selections of indications of product preference in the sets of customer information corresponding to the individual users, wherein the pools comprise:

a first pool of customers that includes customers corresponding to customer information sets that indicate customer selection of the first indication of product preference such that the first pool of customers includes the first customer and the second customer; and a second pool of customers that includes customers corresponding to customer information sets that indicate customer selection of the second indication of product preference such that the second pool of customers includes the third customer;

executing, on the one or more processors of the computer system, one or more computer program modules configured to obtain, over said network, from individual ones of said at least two merchants, bids to provide offers of products to customers in the plurality of customers, wherein a given bid defines an offer of product to be provided to at least some of said plurality of customers;

executing, on the one or more processors of the computer system, one or more computer program modules configured to select bids from the obtained bids to provide offers of products to customers from the plurality of customers, wherein individual selected bids correspond to individual pools of customers such that the selected bids include a first bid that corresponds to the first pool of customers and a second bid that corresponds to the second pool of customers;

executing, on the one or more processors of the computer system, one or more computer program modules configured to individually notify customers of the corresponding pools such that:

based on the selection of the first bid, the customers in the first pool of customers receive over the network offers corresponding to the first bid, and based on the selection of the second bid, the customers in the second pool of customers receive over the network offers corresponding to the second bid.

16. The method of claim 15, further comprising executing, on the one or more processors of the computer system, one or more computer program modules configured to provide to the two or more merchants customer information that corresponds to the pools of customers such that:

the two or more merchants are provided with customer information that corresponds to the first pool of customers, such customer information including customer information from the first set of customer information and customer information from the second set of customer information, and the two or more merchants are provided with customer information that corresponds to the second pool of customers, such customer information including customer information from the third set of customer information.

17. The method of claim 16, wherein the customer information from the first set of customer information and from the second set of customer information that is provided to the two or more merchants comprises the first set of one or more characteristics.

18. The method of claim 17, wherein the first set of characteristics comprises demographics.

19. The method of claim 18, wherein the demographics comprise one or more of geographical location, income, occupation, sex, or age.

20. The method of claim 17, wherein the first set of characteristics comprises information related to historical behavior.

21. The method of claim 20, wherein the information related to historical behavior comprises credit information.

* * * * *